United States Patent
Chir et al.

(10) Patent No.: US 9,303,526 B2
(45) Date of Patent: Apr. 5, 2016

(54) TURBINE COOLING SYSTEM

(75) Inventors: Adam P. Chir, Derby (GB); Andrew M. Rolt, Derby (GB)

(73) Assignee: ROLLS-ROYCE plc, London (GB)

( * ) Notice: Subject to any disclaimer, the term of this patent is extended or adjusted under 35 U.S.C. 154(b) by 888 days.

(21) Appl. No.: 13/119,291

(22) PCT Filed: Aug. 19, 2009

(86) PCT No.: PCT/EP2009/006000
§ 371 (c)(1), (2), (4) Date: Mar. 16, 2011

(87) PCT Pub. No.: WO2010/037450
PCT Pub. Date: Apr. 8, 2010

(65) Prior Publication Data
US 2011/0162387 A1 Jul. 7, 2011

(30) Foreign Application Priority Data
Oct. 3, 2008 (GB) .................................. 0818047.3

(51) Int. Cl.
*F02C 7/18* (2006.01)
*F01D 5/08* (2006.01)
*F01D 25/08* (2006.01)
(Continued)

(52) U.S. Cl.
CPC ................ *F01D 25/08* (2013.01); *F01D 5/081* (2013.01); *F01D 25/14* (2013.01); *F02C 7/141* (2013.01); *F02C 7/185* (2013.01);
(Continued)

(58) Field of Classification Search
CPC .............. F02C 7/125; F02C 7/24; F02C 9/18; F02C 7/12; F02C 7/18; F02C 7/185; F02C 6/08; F05D 2260/20; F05D 2260/213; F01D 5/081; F01D 5/082

USPC ................ 60/782, 785, 266, 806, 39.83, 262; 415/115, 116, 144, 202, 176
See application file for complete search history.

(56) References Cited

U.S. PATENT DOCUMENTS 4,254,618 A * 3/1981 Elovic .......................... 60/226.1
5,161,364 A * 11/1992 Bruun et al. .................... 60/772
(Continued)

FOREIGN PATENT DOCUMENTS

CA 1105276 A1 7/1981
EP 0 564 135 A2 10/1993
(Continued)

OTHER PUBLICATIONS

International Search Report issued in International Application No. PCT/EP2009/006000 dated Jan. 19, 2011.
(Continued)

*Primary Examiner* — Andrew Nguyen
(74) *Attorney, Agent, or Firm* — Oliff PLC (57) ABSTRACT

A cooling system is provided for cooling a turbine of a gas turbine engine. The system has first and second flow paths for guiding cooling air received from the compressor of the engine. The routes of both flow paths bypass the combustor of the engine. The system also has a preswirler for receiving the cooling air at the ends of the two flow paths, swirling the cooling air tangentially to the engine axis, and delivering the swirled cooling air to a rotor of the turbine. The first flow path is routed through a heat exchanger which cools the cooling air guided by the first flow path relative to the cooling air guided by the second flow path.

14 Claims, 6 Drawing Sheets

(51) Int. Cl.
*F01D 25/14* (2006.01)
*F02C 7/141* (2006.01)

(52) U.S. Cl.
CPC ...... *F05D 2260/14* (2013.01); *F05D 2260/211* (2013.01); *Y02T 50/673* (2013.01); *Y02T 50/676* (2013.01)

(56) References Cited

U.S. PATENT DOCUMENTS

| | | | | |
|---|---|---|---|---|
| 5,581,996 | A * | 12/1996 | Koch et al. | 60/782 |
| 5,645,397 | A * | 7/1997 | Soechting et al. | 415/115 |
| 6,551,056 | B2 * | 4/2003 | Rau | 415/115 |
| 6,612,114 | B1 * | 9/2003 | Klingels | 60/785 |
| 2002/0076318 | A1 * | 6/2002 | Patel | 415/115 |
| 2004/0046326 | A1 * | 3/2004 | Yuri et al. | 277/412 |
| 2005/0022535 | A1 * | 2/2005 | Palmisano et al. | 60/772 |
| 2008/0041064 | A1 * | 2/2008 | Moore et al. | 60/782 |

FOREIGN PATENT DOCUMENTS

| | | |
|---|---|---|
| EP | 1 503 061 A1 | 2/2005 |
| EP | 1 676 977 A1 | 7/2006 |
| EP | 1 923 539 A2 | 5/2008 |
| EP | 1 988 260 A2 | 11/2008 |

OTHER PUBLICATIONS

Written Opinion of the International Searching Authority issued in International Application No. PCT/EP2009/006000 dated Jan. 19, 2011.
Search Report issued in corresponding British Application No. GB 0818047.3 dated Jan. 28, 2009.

* cited by examiner

TURBINE COOLING SYSTEM

BACKGROUND

The present invention relates to a cooling system for cooling a turbine of a gas turbine engine.

The high pressure turbine components of an aero gas turbine engine are located in the hottest part of the engine. At around 1600° C., the temperature of the gas stream is greater than the melting temperature of the nickel-based alloys from which the high pressure turbine nozzle guide vanes and rotor blades are typically cast.

It is usual, therefore, to cool nozzle guide vanes and rotor blades internally using cooling air taken from the exit of the high pressure compressor. The cooling air, which bypasses the combustor, may nonetheless be at a temperature of over 700° C. Nozzle guide vanes and rotor blades can also be cooled externally by passing the cooling air through passages connecting the interior to the exterior of the respective component so that the cooling air forms an air film around the component to protect it from the hot gas stream. In order to form the air film, the cooling air in the component must have a positive pressure relative to the exterior gas stream pressure.

As the nozzle guide vanes are static components, they can be supplied with cooling air by relatively straightforward ducting arrangements. Cooling air is typically supplied to the rotor blades after passing through a preswirler which imparts a swirling motion to the cooling air to match the rotation of the rotor disc. The swirling cooling air impinges on the radially outer portion of the rotor disc to cool the disc, and enters internal cavities in the rotor blades via entrance holes in the root regions of the blades.

Although necessary to protect turbine components from the hot gas stream, the extraction of cooling air from the compressor has an adverse effect on engine efficiency. Therefore, the cooling air should be used as effectively as possible.

U.S. Pat. No. 4,254,618 proposes bleeding cooling air from the compressor discharge of a turbofan engine, and routing the cooling air to a heat exchanger located in a diffuser section of the fan duct. The cooled cooling air is then routed through compressor rear frame struts to an expander nozzle and thence to the turbine.

SUMMARY

In general terms the present invention provides a cooling system for cooling a turbine of a gas turbine engine, the system having:

first and second flow paths for guiding cooling air received from the compressor of the engine, the routes of both flow paths bypassing the combustor of the engine; and a preswirler for receiving the cooling air at the ends of the two flow paths, swirling the cooling air tangentially to the engine axis, and delivering the swirled cooling air to a rotor of the turbine;

wherein the first flow path is routed through a heat exchanger which cools the cooling air guided by the first flow path relative to the cooling air guided by the second flow path.

By reducing the temperature of the cooling air on the first flow path in this way, it is possible to cool the rotor more effectively, and, for example, to use less cooling air, which can increase engine efficiency. More specifically, it may be possible to reduce the amount of film cooling of the rotor blades, or employ fewer film cooling holes in the rotor blades. Indeed, with very large temperature reductions, it may even be possible to eliminate film cooling of the rotor blades.

Typically, the first flow path is routed radially outwardly of the combustor. Typically the second flow path is routed radially inwardly of the combustor.

By having two flow paths for cooling air, the robustness of the system can be improved. In particular, if only the first flow path were employed, the system could be vulnerable to failure or partial failure of the heat exchanger, such failure potentially reducing, or in the worst case completely eliminating, the flow of cooling air to the rotor. This in turn could lead to in-flight rotor blade over-heating and failure. However, with two flow paths, even if there is failure or partial failure of the heat exchanger, cooling air can still reach the turbine rotor from the second flow path.

Typically, the heat exchanger comprises a plurality of heat exchanger modules connected in parallel. Thus failure of one module does not prevent the other modules from continuing to perform.

The engine may be a turbofan engine. Conveniently the cooling air guided by the first flow path can then be cooled in the heat exchanger by bypass air received from the fan of the engine. For example, in a high bypass turbofan engine, the heat exchanger may be located adjacent the combustor in a duct which receives a (typically relatively small) proportion of the bypass air from the fan. In a low bypass engine, on the other hand, the heat exchanger may be located directly in the bypass duct of the engine. For open rotor or turbojet engines, the cooling air guided by the first flow path may be cooled in the heat exchanger by nacelle or other ventilation flows, and/or by compressor bleed flows. Alternatively the cooling air guided by the first flow path may be cooled in the heat exchanger partly or solely by engine fuel.

More particularly, a first aspect of the present invention provides a cooling system for cooling a turbine of a gas turbine engine, the system having:

first and second flow paths for guiding cooling air received from the compressor of the engine, the routes of both flow paths bypassing the combustor of the engine; and a preswirler for receiving the cooling air at the ends of the two flow paths, swirling the cooling air tangentially to the engine axis, and delivering the swirled cooling air to a rotor of the turbine;

wherein the first flow path is routed through a heat exchanger which cools the cooling air guided by the first flow path relative to the cooling air guided by the second flow path; and between the heat exchanger and the preswirler the first flow path is routed through nozzle guide vanes of the turbine.

With the first flow path routed through the nozzle guide vanes, a further advantage of having two flow paths for cooling air, is that the flow area for the cooling air guided by the first flow path can be reduced to a level such that, the vanes can be configured to accommodate the first flow path without having to make significant changes to the external form of the vanes. On the other hand, if the entire cooling flow were routed through the vanes, it might be necessary to adopt, for example, a less than optimal wide chord vane design to accommodate the cooling flow.

The nozzle guide vanes are preferably upstream of the turbine rotor. Conveniently, the preswirler may then be located radially inwardly of the nozzle guide vanes and also upstream of the rotor.

Preferably, the nozzle guide vanes have respective internal cavities which receive, in use, a flow of further cooling air; and each vane further has one or more transfer passages which form the route of the first flow path through the vane, the or each passage traversing the respective internal cavity so that the cooling air which flows along the first flow path through the or each passage reduces the temperature of the further cooling air received by the internal cavity.

Thus, as well as reducing the temperature of the cooling air delivered to the rotor, the cooling air on the first flow path can reduce the temperature of the further cooling air of the vanes. The or each passage may have fins of other features for enhancing heat transfer between the cooling air in the passage and the further cooling air received by the cavity.

As the lowered temperature of the further cooling air reduces the static pressure of that flow, the or each transfer passage may have one or more bleed holes which allow a portion of the cooling air guided by the first flow path to be bled into the flow of further cooling air. In this way, the further cooling air can be supplemented to compensate for its static pressure loss and to increase the effectiveness of the vane cooling. Nonetheless, the increased effectiveness of cooling can allow an overall reduction in cooling air mass flow to the vanes, which can improve engine efficiency.

Indeed, it may be desirable to bleed off a portion of the cooling air guided by the first flow path for other cooling purposes before that air reaches the preswirler. The preswirler may include a receiving chamber which receives the cooling air of both flow paths, the chamber being arranged so that the cooling air from the second flow path is swirled in the chamber to reduce its static pressure and thereby educe the cooling air from the first flow path into the chamber.

Generally, because of its reduced temperature, the cooling air arriving from the first flow path will be at a lower static pressure than the cooling air arriving from the second flow path. This can cause difficulties if it is desired, for example, to entrain or mix the cooling air from the first flow path with the cooling air from the second flow path in the receiving chamber. By swirling the cooling air from the second flow path to reduce its static pressure these difficulties can be overcome.

Alternatively, the preswirler may include a first receiving chamber which receives the cooling air of the first flow path and a second receiving chamber which receives the cooling air of the second flow path, the chambers having respective outlet nozzles which deliver the cooling air to the rotor.

Such an arrangement avoids the entrainment or mixing difficulties described above, and may be desirable when different parts of the turbine rotor have different respective cooling requirements. Cooling air from one of the flow paths can then be delivered to one part of the rotor without being substantially mixed with cooling air from the other flow path.

Indeed, a second aspect of the present invention provides a cooling system for cooling a turbine of a gas turbine engine, the system having:

first and second flow paths for guiding cooling air received from the compressor of the engine, the routes of both flow paths bypassing the combustor of the engine; and a preswirler for receiving the cooling air at the ends of the two flow paths, swirling the cooling air tangentially to the engine axis, and delivering the swirled cooling air to a rotor of the turbine;

wherein the first flow path is routed through a heat exchanger which cools the cooling air guided by the first flow path relative to the cooling air guided by the second flow path; and the preswirler includes a receiving chamber which receives the cooling air of both flow paths, the chamber being arranged so that the cooling air from the second flow path is swirled in the chamber to reduce its static pressure and thereby educe the cooling air from the first flow path into the chamber.

Further, a third aspect of the present invention provides a cooling system for cooling a turbine of a gas turbine engine, the system having:

first and second flow paths for guiding cooling air received from the compressor of the engine, the routes of both flow paths bypassing the combustor of the engine; and a preswirler for receiving the cooling air at the ends of the two flow paths, swirling the cooling air tangentially to the engine axis, and delivering the swirled cooling air to a rotor of the turbine;

wherein the first flow path is routed through a heat exchanger which cools the cooling air guided by the first flow path relative to the cooling air guided by the second flow path; and the preswirler includes a first receiving chamber which receives the cooling air of the first flow path and a second receiving chamber which receives the cooling air of the second flow path, the chambers having respective outlet nozzles which deliver the cooling air to the rotor.

The following optional features pertain, as appropriate, to any one of the first, second and third aspects of the invention.

Preferably, the or each receiving chamber is an annular passage coaxial with the engine axis. This allows the cooling air to swirl around the chamber in a direction tangential to the engine axis (which direction is preferably matched to the direction of rotation of the rotor). Preferably the or each receiving chamber has inlet nozzles for the cooling air that are angled to promote the swirling motion in the receiving chamber. The inlet nozzles can be circumferentially spaced around the chamber. Preferably the or each receiving chamber has outlet nozzles for the cooling air that deliver the cooling air to the turbine rotor. The outlet nozzles can be circumferentially spaced around the chamber. The outlet nozzles may be flow metering nozzles which determine the volume flow rate of cooling air delivered from the receiving chamber to the turbine rotor. Then, when the receiving chamber receives the cooling air from both flow paths, even if flow along, for example, the first flow path is intentionally or unintentionally reduced or blocked, the overall volume flow rate of cooling air to the rotor can be maintained. The outlet nozzles are preferably angled to swirl the cooling air in a direction tangential to the engine axis (which direction is preferably matched to the direction of rotation of the rotor). Angling the outlet nozzles allows the tangential component of flow around an annular receiving chamber to be transmitted efficiently to the cooling air delivered to the rotor.

Preferably, the amount of cooling air cooled by the heat exchanger relative to the total amount of cooling air guided by the first and second flow paths is controllable. When the preswirler has a receiving chamber which receives and mixes the cooling air of both flow paths, the temperature of the cooling air delivered by the preswirler can then be controllably varied. Generally, at take-off engine operating conditions, the turbine cooling requirement is at a maximum, whereas at cruise operating conditions, the cooling requirement is reduced. However, it is disadvantageous for the temperature of the cooling air delivered to the rotor to be lower than is necessary at any particular operating condition, as this reduces engine efficiency. Thus, for example, the heat exchanger may be controllably bypassable on the first flow path, or indeed the first flow path may be controllably deactivatable, so that the temperature of the cooling air delivered by the preswirler can be increased at cruise.

A further aspect of the invention provides a gas turbine engine having the cooling system of the previous aspect.

BRIEF DESCRIPTION OF THE DRAWINGS

Embodiments of the invention will now be described by way of example with reference to the accompanying drawings in which.

DETAILED DESCRIPTION

Figure 1:
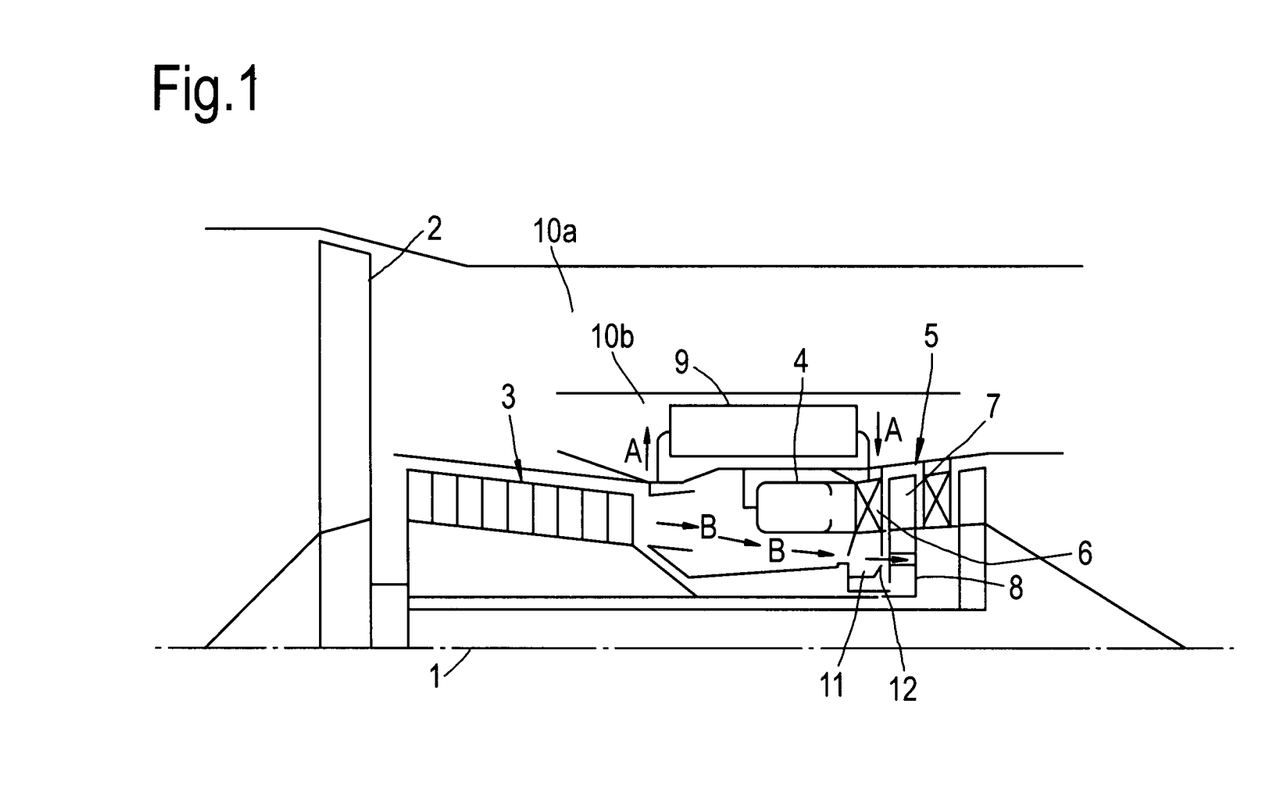
FIG. 1 shows a schematic meridional section through a turbofan engine having a cooling system for cooling a turbine of the engine.

FIG. 1 shows a schematic meridional section through a turbofan engine. The engine has an engine axis 1, and, in flow series, a fan 2, a compressor section 3, a combustor 4, and a turbine section 5. The turbine section includes a high pressure turbine having a set of nozzle guide vanes 6, and a set of rotor blades 7 mounted on a rotor disc 8.

The engine has a cooling system for cooling the high pressure turbine. Cooling air is extracted from the exit of compressor section 3 and passes along two flow paths A and B, indicated by arrows in FIG. 1.

Considering first flow path A, the cooling air passes from the engine core along suitable conduits to a plurality of high effectiveness heat exchanger modules 9 spaced circumferentially around the engine. The heat exchanger modules are located in a duct 10b which diverts a portion of the bypass air generated by the fan 1 from the main bypass duct 10a.

The heat exchanger modules 9 reduce the temperature of the cooling air, which then passes along transfer passages through the nozzle guide vanes 6 to a preswirler 11, which has an annular receiving chamber located radially inwardly of the nozzle guide vanes and just upstream of the rotor disc 8. Typically, each heat exchanger module distributes the cooling air through a sector of e.g. at least ten or twelve nozzle guide vanes In contrast, the cooling air on flow path B partially flows along the wall of the combustion chamber of the combustor radially inwardly of the combustor 4 to travel more directly into the preswirler_11. The cooling air entering 30 the preswirler_11 from flow path A thus has a lower temperature than the cooling air entering the preswirler_11 from flow path B.

The two air flows are mixed in the preswirler11 and assume a moderate swirling motion in the direction of rotation of the rotor disc 8. Further swirl is imparted to the cooling air as it passes through circumferentially spaced flow-metering output nozzles 12 from the receiving chamber of preswirler11 to impinge on the radially outer part of the rotor disc 8. The cooling air cools the disc and also enters internal cavities in the rotor blades 7 through entrance holes in the roots of the blades to cool the blades. The flow area of the output nozzles 12 determines the volume flow rate of the cooling air which issues from the receiving chamber of the preswirler to the disc.

Optionally, the cooling system has a recompressor (not shown in FIG. 1) in series with the heat exchanger modules to ensure that the air on flow path A has the correct pressure at entry to the preswirler11. However, preferably such a recompressor is not required.

The mixed cooling flow has a lower temperature than a conventional cooling flow taken directly from the compressor exit and not passed through any heat exchanger. Thus the flow is more effective at cooling the turbine, and less cooling air may need to be diverted from the core air flow, which in turn may raise the efficiency of the engine.

Rotor blade cooling designs (particularly film cooled designs) typically operate over a narrow coolant flow rate margin. However, the cooling system, in case of failure of one or some of the heat exchanger modules, can maintain the required flow of cooling air to the rotor blades simply by educing more flow along flow path B. Thus the system is robust enough to withstand heat exchanger failure.

Further, the cooling system facilitates cooling modulation (i.e. switching cooling on or off) at cruise. Such modulation can provide specific fuel consumption benefits, particularly for large civil turbofans. For example, heat exchanger modules can be bypassed or isolated on flow path A, or flow path A can be closed completely and the turbine cooling flow made up solely with air from flow path B.

An additional advantage of the cooling system is that the flow rate on flow path A is only a portion of the total flow into the preswirler11, and can be set at a sufficiently low such that no redesign of the external shape of the vanes 6 may be necessary in order to accommodate the transfer passages through the vanes which connect the heat exchanger modules with the mixing chamber. Indeed, the cooled air which issues from the heat exchanger modules 9 has an increased density, whereby the flow rate for a given flow area and Mach number is higher.

Focusing then on the nozzle guide vanes 6, the cooled air on flow path A which issues from the heat exchanger modules 9 is routed to the preswirler11 along the one or more transfer passages extending from the radially outer to the radially inner end of each vane. One or more internal cavities are formed in each vane to receive a flow of vane cooling air, and the transfer passages traverse these cavities. The cooled air unavoidably exchanges heat with the vane cooling air flowing though the cavities. Indeed, the heat exchange effectiveness can be enhanced by the addition of fins or other features for enhancing heat transfer between the interior and exterior of the transfer passages.

Thus the cooled air can be used advantageously to lower the temperature of the vane cooling air. In particular, the vane trailing edge, which tends to be the most difficult part of a vane to protect from the high core gas temperatures, can benefit significantly from a lowered temperature in the trailing edge cooling flow (which is a portion of the vane cooling air routed through a plurality of passages connecting the internal cavity with the outer of the vane to form an external air film on the trailing edge). As the lowered temperature, however, reduces the static pressure of that flow, it may optionally be supplemented by bleeding a portion of the cooled air flowing through the or each transfer passage into the vane cooling air, e.g. by means of one or more bleed holes in the transfer passage. The bled air further lowers the temperature of the vane cooling air. Additionally, if there is sufficient pressure margin, the positions of the bleed holes may be arranged such that at least some of the bled air impinges on internal parts of the vane to help eliminate one or more vane hot spots.

Improved cooling of the vane trailing edge can allow a thinner trailing edge configuration to be adopted, which in turn can improve aerodynamic performance of the vane.

The transfer passages are not necessarily cast as a single piece with the nozzle guide vanes. For example, the passages may be formed as separate tubes which may be easier to manufacture and can better accommodate differential thermal expansion of the passages relative to the vanes. The tubes may be formed from shape memory or super-plastically formable alloys, which have relatively low high temperature stiffness, and which return to their original shape after loading and thermal cycling. Alternatively, the tubes may be formed of relatively high thermal expansion coefficient material which, because the tubes will be cooler than the material of the surrounding vane, results in a matched thermal expansion with the vane.

Figure 2A:
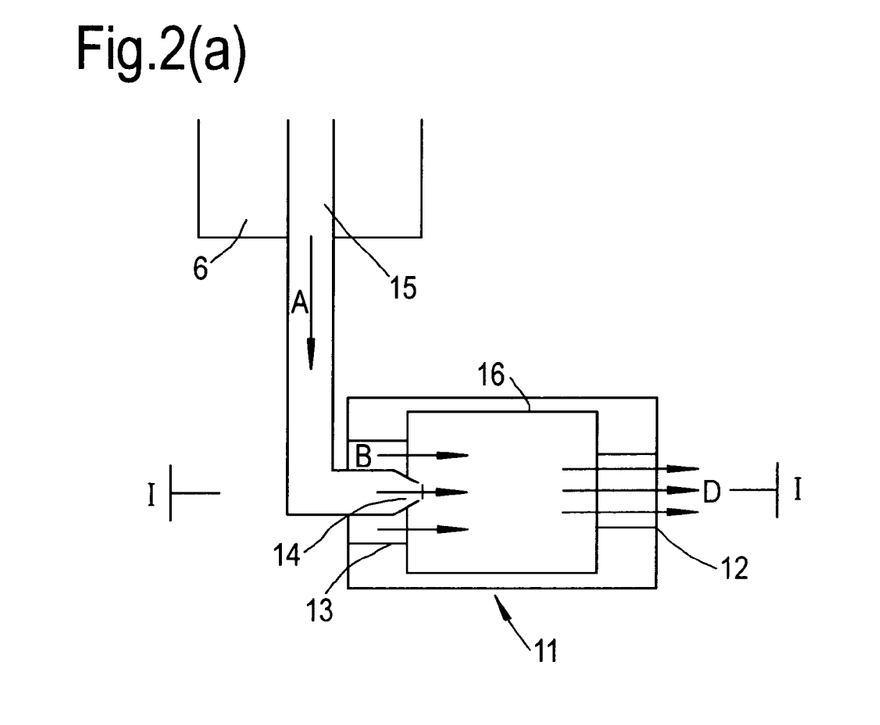
FIG. 2(a) is a schematic cross-section through a preswirler of the cooling system of FIG. 1 on a meridional plane of the engine.
Figure 2B:
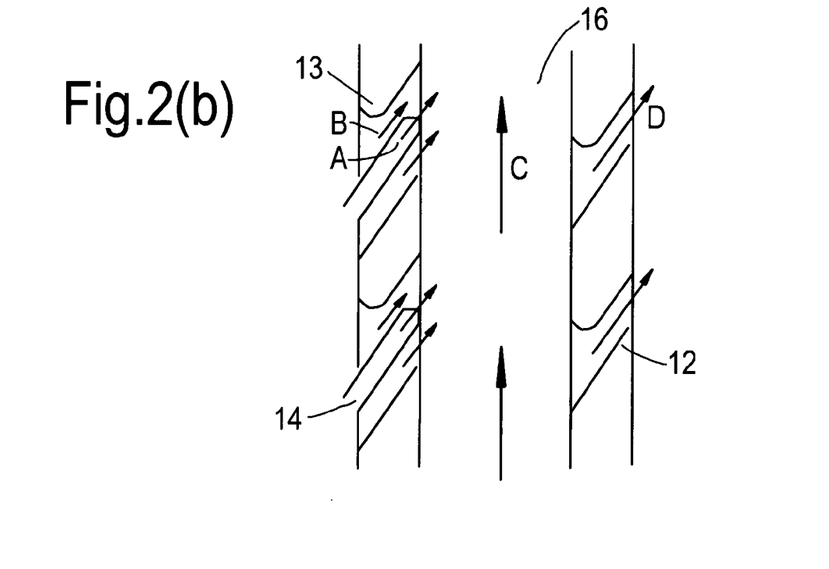
FIG. 2(b) is a section along line I-I FIG. 2(a)

The cooled air from flow path A is mixed with the uncooled air from flow path B in the preswirler11. FIG. 2(a) is a schematic cross-section through the preswirler on a meridional plane of the engine, and FIG. 2(b) is a section along line I-I FIG. 2(a). The preswirler has a receiving chamber 16 which accepts the uncooled cooling flow through angled inlet swirling nozzles 13 to moderately swirl (as indicated by arrows C) the slightly higher pressure uncooled cooling flow within the chamber and reduce its static pressure, while angled jetting nozzles 14 educe the lower total pressure cooled cooling flow which is supplied from the transfer passages 15 which traverse the inlet guide vanes 6. The amount of swirl in the receiving chamber may be quite high in order to sufficiently reduce the static pressure of the uncooled cooling flow. Thus preferably, the inner walls of the chamber are smooth in the swirl (circumferential) direction to avoid unnecessary drag. Appropriate design of inlet swirling nozzle angle and jetting nozzle angle promotes mixing of the cooled and uncooled flows to produce a moderately cooled flow. This then issues (as indicated by arrows D) through flow-metering angled output nozzles 12 to increase the amount of swirl and typically to direct the cooling flow onto the bucket grooves (the bottom unfilled parts of the slots formed in the periphery of a disc which accept and retain the roots of the blades) of rotor disc 8. Alternatively, the cooling flow, may be directed onto other parts of they disc, or a disc coverplate before reaching the blade-retaining bucket grooves.

The flow area of the flow-metering output nozzles 12 governs the volume flow rate exhausted from the receiving chamber. Thus any deficiency in the cooled flow from path A will be compensated by an increase in the uncooled flow from path B, minimising the risk of hot gas ingestion at the turbine disc rim in the event of an upstream failure in the heat exchanger modules.

Figure 3:
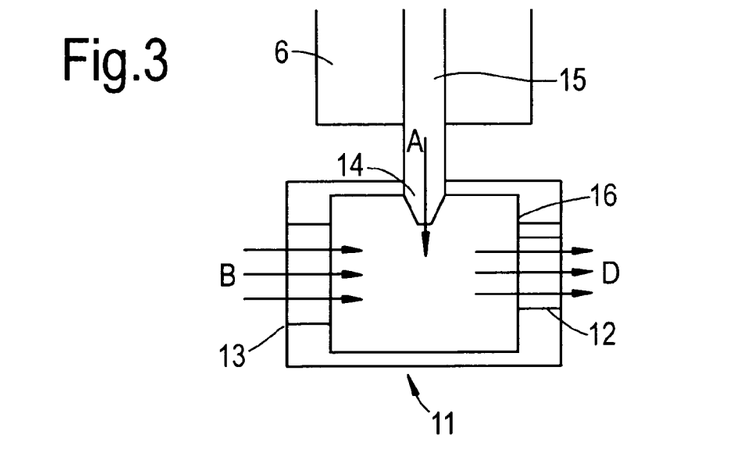
FIG. 3 is a schematic cross-section through a different embodiment of the preswirler.
Figure 4:
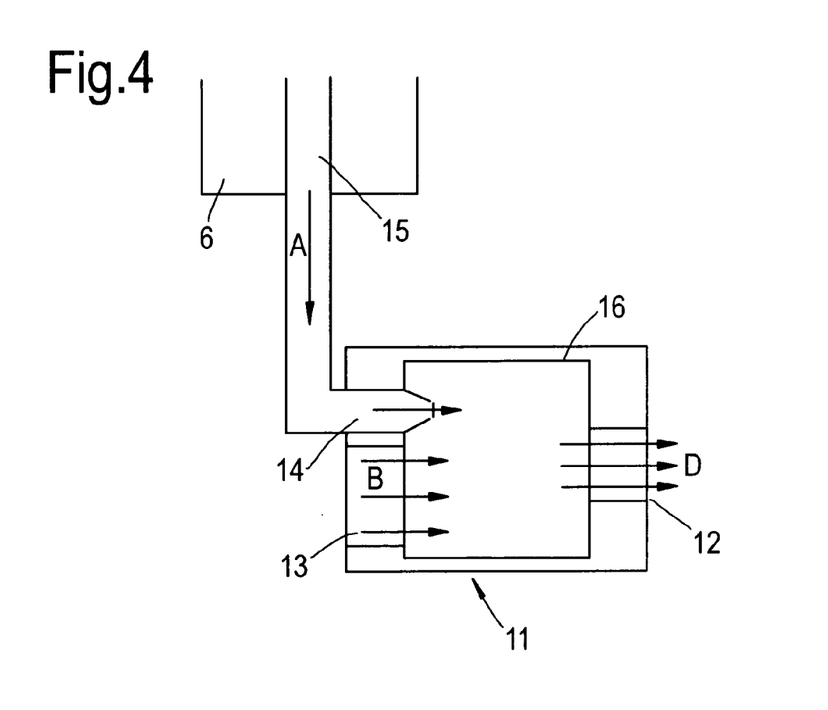
FIG. 4 is a schematic cross-section through another embodiment of the preswirler.
Figure 5A:
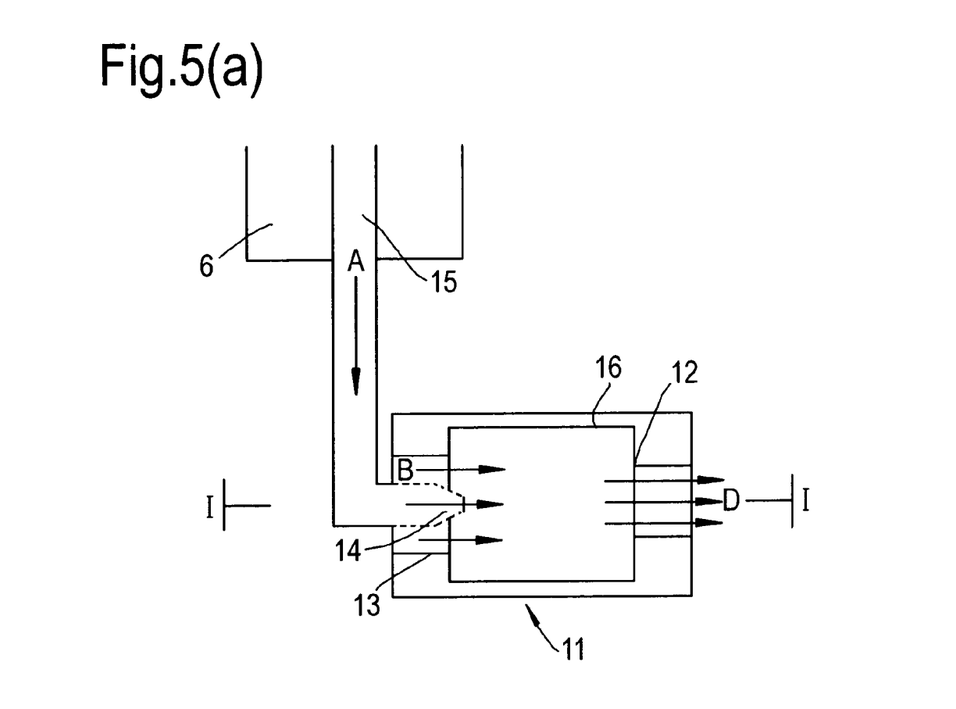
FIG. 5(a) is a schematic cross-section through a further embodiment of the preswirler.
Figure 5B:
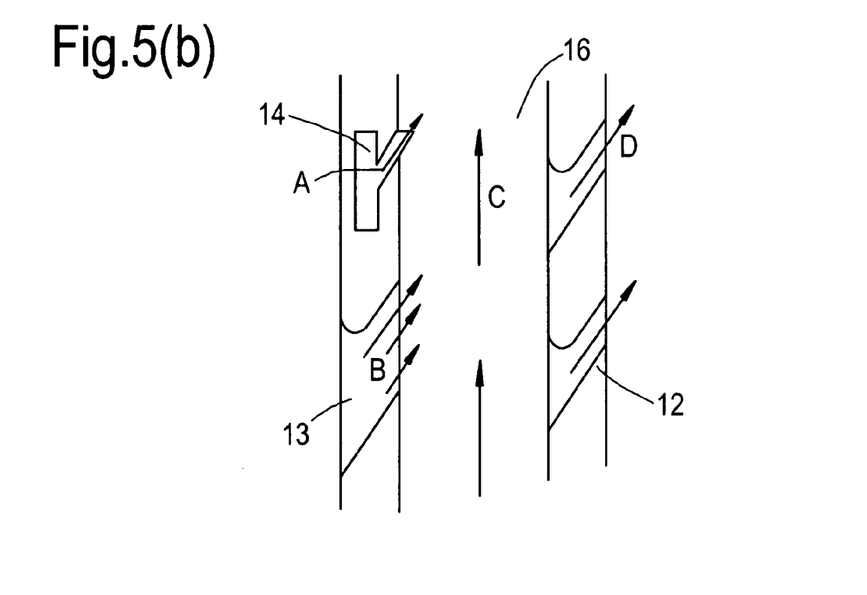
FIG. 5(b) is a section along line I-I FIG. 5(a)
Figure 6:
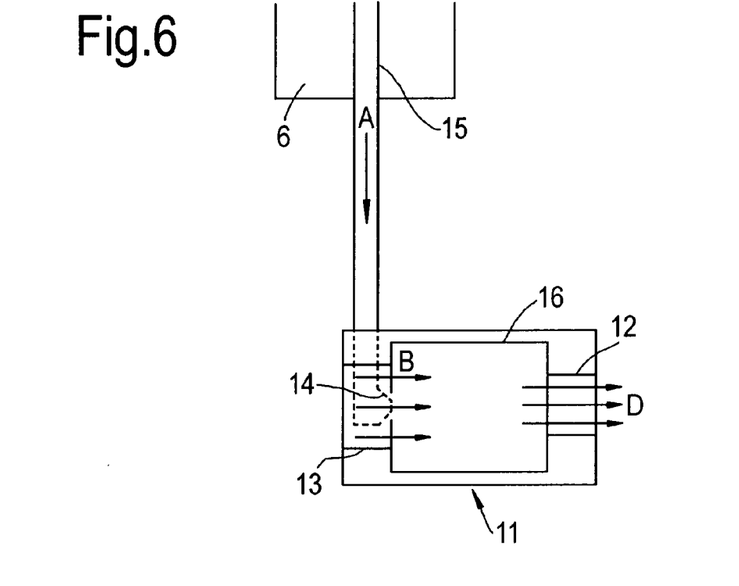
FIG. 6 is a schematic cross-section through a variant of the preswirler of FIG. 5.

In the embodiment of FIGS. 2(a) and (b), the jetting nozzles 14 are coaxial with the inlet swirling nozzles 13, both entering the receiving chamber 16 through its upstream wall. However, other arrangements are possible. For example, FIG. 3 is a schematic cross-section through the preswirler 11 of an embodiment in which the jetting nozzles enter the receiving chamber 16 through its radially outer wall. This can help to reduce windage losses in the cooled cooling flow A. FIG. 4 is a schematic cross-section through the preswirler 11 of another embodiment in which the jetting nozzles 14 enter the receiving chamber 16 through its upstream wall, but radially outwardly of the inlet swirling nozzles 13. FIG. 5(a) is a schematic cross-section through the preswirler 11a further embodiment, and FIG. 5(b) is a section along line I-I FIG. 5(a). In this embodiment, the jetting nozzles 14 enter the receiving chamber 16 through its upstream wall but at circumferentially spaced locations relative to the inlet swirling nozzles 13. FIG. 6 is a schematic cross-section through a variant of the preswirler of FIG. 5. In this variant, the cooled cooling flow A is introduced through the radially outer wall of the receiving chamber 16 rather than through its upstream wall.

Figure 7:
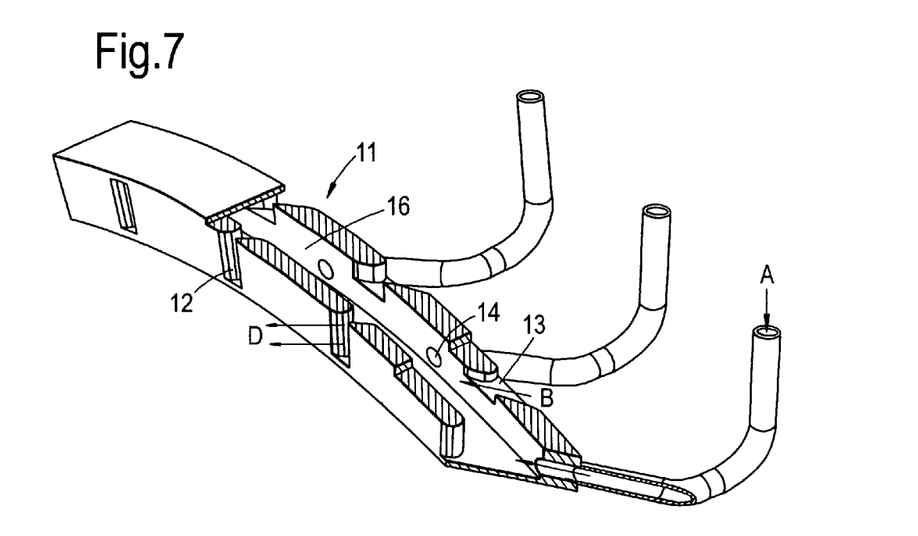
FIG. 7 is a cut-away view of a portion of another embodiment of the preswirler.
Figure 8:
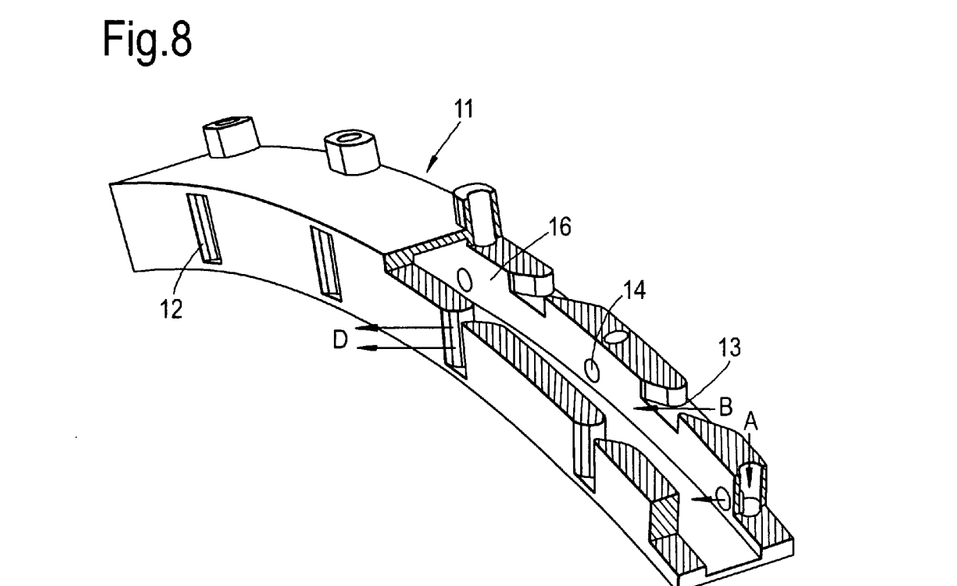
FIG. 8 is a cut-away view of a portion of a variant of the preswirler of FIG. 7.

FIG. 7 is a cut-away view of a portion of another embodiment of the preswirler 11. In this embodiment, like the embodiment of FIGS. 5(a) and (b), the jetting nozzles enter the annular receiving chamber 16 through its upstream wall and at circumferentially spaced locations relative to the inlet swirling nozzles 13. The nozzles 13 significantly increase the tangential velocity of the compressor delivery uncooled cooling flow B into the chamber, lowering its static pressure and enabling entrainment of the cooled cooling flow C. However, the nozzles 13 are also positioned radially outwards of the nozzles 14 on the upstream wall of the chamber 16. With this arrangement there is some mixing of the airflows within the chamber. However a temperature profile within the flow persists with the hotter air from flow B tending to remain radially outwards of the cooler air from flow A. This results in a corresponding temperature profile in the flow emerging from angled flow-metering output nozzles 12. Such a profile can be advantageous as it enables cooler cooling air to be fed to the high pressure turbine disc and blades, while hotter cooling air can be fed to the turbine disc seals. FIG. 8 is a cut-away view of a portion of a variant of the preswirler of FIG. 7. In this variant, the cooled cooling flow A is introduced through the radially outer wall of the receiving chamber 16 rather than through its upstream wall.

Figure 9:
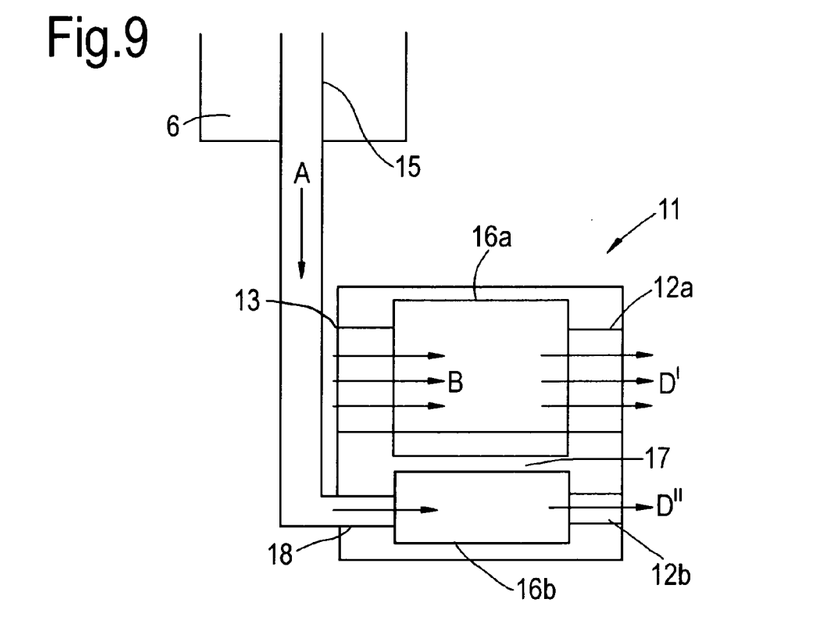
FIG. 9 is a schematic cross-section through another embodiment of the preswirler.

FIG. 9 is a schematic cross-section through another embodiment of the preswirler 11. In this embodiment, there are two radially spaced annular receiving chambers 16a, 16b, with a wall 17 preventing fluid communication between the chambers. The uncooled cooling flow B is introduced into the radially outer chamber 16a through angled inlet swirling nozzles 13, and the cooled cooling flow A is introduced into the radially inner chamber 16b through angled inlet swirling nozzles 18 (rather than jetting nozzles as in the previous embodiments). A tangentially swirling flow is generated in each chamber. Respective angled flow-metering output nozzles 12a, 12b from the chambers produce respective cooling flows D' and D", flow D" being cooler than flow D' and better positioned for feeding to the high pressure turbine disc and blades, while flow D' can be fed to the turbine disc seals.

The wall 17 can contain apertures (not shown) which connect the receiving chambers 16a, 16b but which are configured so that under normal operating conditions they do not allow air to pass from one chamber to another. In the event, however, of a failure of or reduction in the cooled cooling flow A into the chamber 16b, the apertures allow air from the uncooled cooling flow B to enter the chamber 16b. A sufficient flow of cooling air to the rotor blades can then be maintained by educing more flow along flow path B.

While the invention has been described in conjunction with the exemplary embodiments described above, many equivalent modifications and variations will be apparent to those skilled in the art when given this disclosure. For example, although the cooling system has been described in relation to an aero gas turbine engine, it is applicable to non-aero gas turbines as well. Accordingly, the exemplary embodiments of the invention set forth above are considered to be illustrative and not limiting. Various changes to the described embodiments may be made without departing from the spirit and scope of the invention.

The invention claimed is:

1. A cooling system for cooling a turbine of a gas turbine engine, the system comprising:
   a first flow path and a second flow path that guide cooling air received from a core flow of a compressor of the engine, the start of both flow paths being at the core flow and the routes of both flow paths bypassing a combustor of the engine, the combustor comprising a combustion chamber having a wall, a compressor exit downstream of the compressor and upstream of the combustor, the first flow path flowing radially outwardly from the compressor exit, the second flow path at least partially defined by the combustion chamber wall; and
   a preswirler including a plurality of interconnected walls that define a receiving chamber that receives the cooling air through a first inlet and a second inlet at the ends of the first flow path and the second flow path, respectively, the preswirler swirling the cooling air tangentially to an engine axis, and delivering the swirled cooling air to a rotor of the turbine, wherein
   the first flow path is routed through a heat exchanger which cools the cooling air guided by the first flow path relative to the cooling air guided by the second flow path, wherein
   between the heat exchanger and the preswirler the first flow path is routed through nozzle guide vanes of the turbine,
   the receiving chamber includes flow-metering outlet nozzles through which flow exits from the receiving chamber, the outlet nozzles having a flow area that determines the volume flow rate of cooling air delivered from the receiving chamber to the turbine rotor,
   the rotor is defined by a set of interconnected walls that are different from the plurality of interconnected walls of the receiving chamber, and
   when the flow is obstructed in either the first flow path or the second flow path, the non-obstructed flow path increases the flow of cooling air to the receiving chamber in order to compensate for the obstructed flow path and maintain the volume flow rate of cooling air delivered to the receiving chamber.

2. The cooling system according to claim 1, wherein the turbine nozzle guide vanes are upstream of the rotor.

3. The cooling system according to claim 1, wherein the nozzle guide vanes have respective internal cavities which receive, in use, a flow of further cooling air; and
   each vane further has one or more transfer passages which form the route of the first flow path through the vane, the or each passage traversing the respective internal cavity so that the cooling air which flows along the first flow path through the or each passage reduces the temperature of the further cooling air received by the internal cavity.

4. The cooling system according to claim 3, wherein the or each transfer passage has one or more bleed holes which allow a portion of the cooling air guided by the first flow path to be bled into the flow of further cooling air.

5. The cooling system according to claim 1, wherein the preswirler includes the receiving chamber which receives the cooling air of both flow paths, the chamber being arranged so that the cooling air from the second flow path is swirled in the chamber to reduce its static pressure and thereby educe the cooling air from the first flow path into the chamber.

6. A cooling system for cooling a turbine of a gas turbine engine, the system comprising:
   a first flow path and a second flow path that guide cooling air received from a core flow of a compressor of the engine, the start of both flow paths being at the core flow and the routes of both flow paths bypassing a combustor of the engine, the combustor comprising a combustion chamber having a wall, a compressor exit downstream of the compressor and upstream of the combustor, the first flow path flowing radially outwardly from the compressor exit, the second flow path at least partially defined by the combustion chamber wall; and
   a preswirler that receives the cooling air through a first inlet and a second inlet at the ends of the first flow path and the second flow path, respectively, swirling the cooling air tangentially to an engine axis, and delivering the swirled cooling air to a rotor of the turbine, wherein
   the first flow path is routed through a heat exchanger which cools the cooling air guided by the first flow path relative to the cooling air guided by the second flow path,
   the preswirler includes a plurality of interconnected walls that define a receiving chamber which receives the cooling air of the first flow path and the second flow path, the chamber being arranged so that the cooling air from the second flow path is swirled in the chamber to reduce its static pressure and thereby educe the cooling air from the first flow path into the chamber,
   the receiving chamber includes flow-metering outlet nozzles through which flow exits from the receiving chamber, the outlet nozzles having a flow area that determines the volume flow rate of cooling air delivered from the receiving chamber to the turbine rotor,
   the rotor is defined by a set of interconnected walls that are different from the plurality of interconnected walls of the receiving chamber, and
   when the flow is obstructed in either the first flow path or the second flow path, the non-obstructed flow path increases the flow of cooling air to the receiving chamber in order to compensate for the obstructed flow path and maintain the volume flow rate of cooling air delivered to the receiving chamber.

7. The cooling system according to claim 1, wherein:
   the receiving chamber includes a first receiving chamber and a second receiving chamber; and
   the first receiving chamber receives the cooling air of the first flow path, the second receiving chamber receives the cooling air of the second flow path, and the outlet nozzles include at least a first outlet nozzle for the first receiving chamber and at least a second outlet nozzle for the second receiving chamber, the outlet nozzles delivering the cooling air to the rotor.

8. The cooling system according to claim 5, wherein the receiving chamber is an annular passage coaxial with the engine axis.

9. The cooling system according to claim 1, wherein the engine is a turbofan engine, and the cooling air guided by the first flow path is cooled in the heat exchanger by bypass air received from the fan of the engine.

10. The cooling system according to claim 6, wherein the engine is a turbofan engine, and the cooling air guided by the first flow path is cooled in the heat exchanger by bypass air received from the fan of the engine.

11. The cooling system according to claim 1, wherein the amount of cooling air cooled by the heat exchanger relative to the total amount of cooling air guided by the first and second flow paths is controllable.

12. The cooling system according to claim 6, wherein the amount of cooling air cooled by the heat exchanger relative to the total amount of cooling air guided by the first and second flow paths is controllable.

13. A gas turbine engine having the cooling system of claim 1.

14. A gas turbine engine having the cooling system of claim 6.

* * * * *